Figure 1:
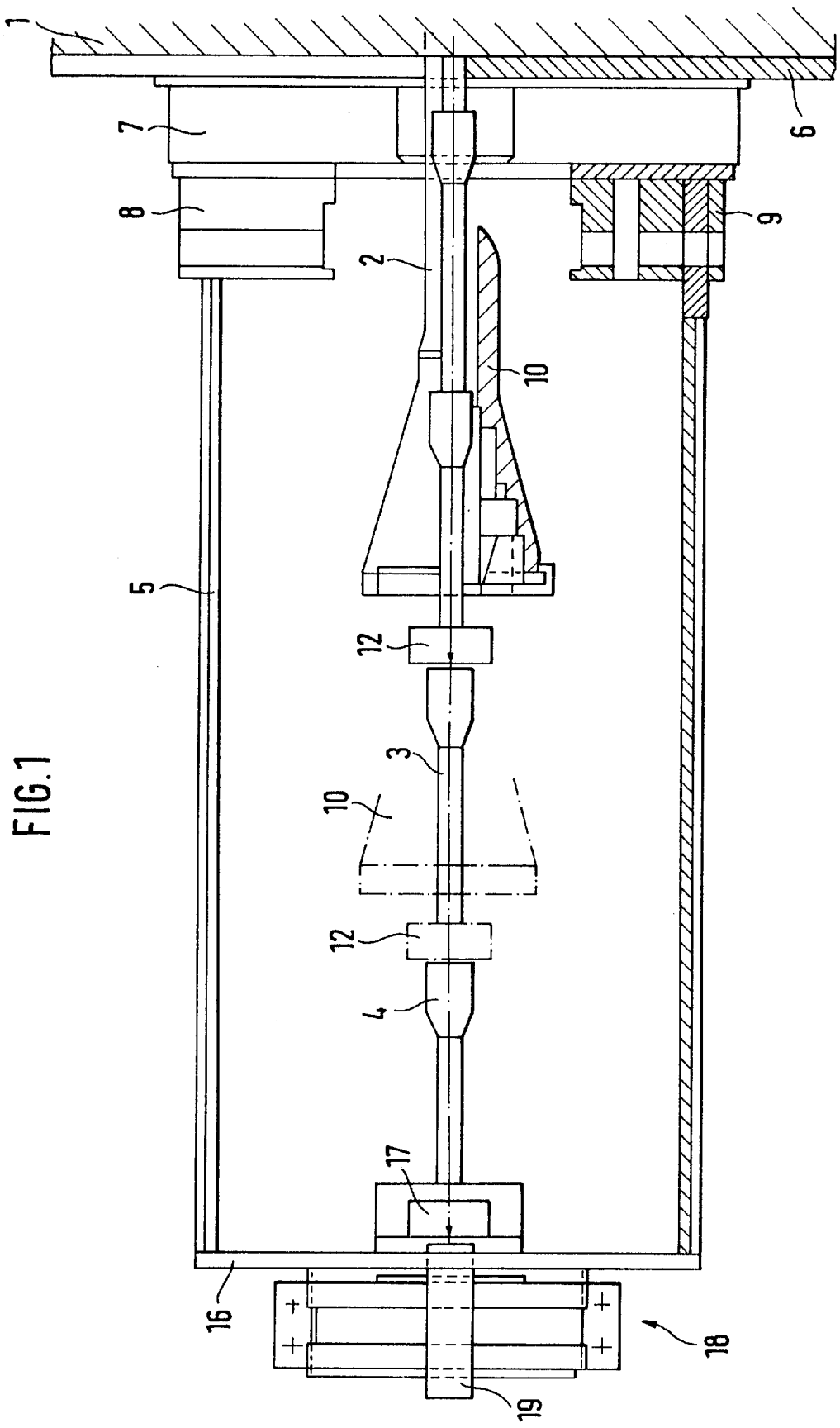

United States Patent

Schwert

[11] Patent Number: 5,997,215
[45] Date of Patent: Dec. 7, 1999

[54] PROCESS AND DEVICE FOR PULLING A PIPE LAID OR TO BE LAID IN THE GROUND

[76] Inventor: Siegfried Schwert, Nieritzweg 11, D-14165, Berlin, Germany

[21] Appl. No.: 08/913,906

[22] PCT Filed: Mar. 26, 1996

[86] PCT No.: PCT/DE96/00595

§ 371 Date: Sep. 24, 1997

§ 102(e) Date: Sep. 24, 1997

[87] PCT Pub. No.: WO96/30690

PCT Pub. Date: Oct. 3, 1996

[30] Foreign Application Priority Data

Mar. 31, 1995 [DE] Germany .......................... 195 13 181

[51] Int. Cl.[6] ..................................................... F16L 1/00
[52] U.S. Cl. .............................. 405/184; 175/53; 175/62; 405/154
[58] Field of Search .................... 405/184, 156, 405/154; 175/62, 53; 254/29 R

[56] References Cited

U.S. PATENT DOCUMENTS

| | | |
|---|---|---|
| 4,626,134 | 12/1986 | Coumont .................................. 405/184 |
| 5,015,124 | 5/1991 | Perry ...................................... 405/184 |
| 5,205,671 | 4/1993 | Handford . | |
| 5,282,696 | 2/1994 | Solomon et al. ........................ 405/184 |
| 5,439,320 | 8/1995 | Abrams . | |
| 5,484,232 | 1/1996 | Hayashi et al. .......................... 405/184 |
| 5,782,311 | 7/1998 | Wentworth ........................... 405/184 X |

FOREIGN PATENT DOCUMENTS

| | | |
|---|---|---|
| 0493645 A1 | 7/1992 | European Pat. Off. . |
| 3733463 C1 | 3/1989 | Germany . |
| 3912728 C1 | 11/1989 | Germany . |

*Primary Examiner*—Dennis L. Taylor
*Attorney, Agent, or Firm*—Marshall & Melhorn

[57] ABSTRACT

The invention relates to a process for pulling a pipe (2) laid and/or to be laid in the ground to a trench below and accessible from ground level, in which there is a traction system in engagement with a traction component (3). The traction component is taken through the pipe and engaged with its rear end, viewed in the pulling direction. The traction component with the pipe is then drawn to the trench in steps by the traction system, with the traction device making a forward and a backward stroke at each step. During the backward stroke the traction component is kept under a tension corresponding to its elastic expansion during the forward stroke. In this way the traction component is kept permanently under tension throughout the pulling process, thus preventing the traction component from alternately expanding and contracting at each step. In a preferred device for implementing this process, the traction component has catches (4) with a predetermined spacing and the traction system has a pulling member (12) which engages with one of the catches during the forward stroke and a retainer (17) which is engaged with one of the catches during the backward stroke.

39 Claims, 8 Drawing Sheets

PROCESS AND DEVICE FOR PULLING A PIPE LAID OR TO BE LAID IN THE GROUND

There is known from DE 37 33 463 C1 a method of changing pipes laid in the earth, in which an old pipe is removed and a new pipe is inserted in its place in the region between an insertion ditch and a target ditch. In this case a common drawing device pulls the old pipe to the target ditch and there breaks it up, and, following the old pipe, draws the new pipe from the insertion ditch to the target ditch. The drawing device engages on the rear end of the new pipe in the direction of drawing, the old and the new pipes being connected together positively by an adapter transmitting the forces occurring between them. A traction member, like a traction rod, comprising a plurality of short individual rods connected together by screw couplings, is pushed through the two pipes and brought into engagement with the rear end of the new pipe on the one hand and with the drawing device on the other hand. The traction rod is then drawn in stages towards the target ditch together with the two pipes, the drawing device executing upon each step a forward stroke in which the entire traction force acts on the traction rod, and a reverse stroke in which the traction rod is relaxed. If however long pipes or pipelines combined from a plurality of pipes are changed, considerable traction forces may be necessary. In this case the elastic expansion of the traction member during the forward stroke can be so great that this corresponds to a large proportion, sometimes considerably more than half of the stroke length. As the traction member is stressed and relaxed upon each step, i.e. is elastically stretched and then draws together again by the same distance, the actual feed of the pipes during one step corresponds to the stroke length of the drawing device minus the respective elastic stretch. In this way the feed of the pipes in one step can be considerably less than the stroke length of the drawing device, so that the efficiency of the drawing device is correspondingly reduced.

Accordingly, it is the object of the present invention to provide a method for drawing a pipe laid in the earth and/or to be laid in the earth to a ditch lying beneath the surface of the earth, and accessible therefrom, in which there is disposed a drawing device in engagement with a traction member, the traction member being passed through the pipe and engaging thereon behind its rear end in the direction of drawing, or the traction member engages on the pipe at the front end in the direction of drawing and is drawn towards the ditch with the pipe in steps by the drawing device, in such a way that the drawing device upon each step executes a forward and a reverse stroke, in which the feed of the pipe during one step corresponds to the entire stroke length of the drawing device, so that a reduction in efficiency does not occur even at high tensile forces.

This object is achieved according to the invention by the feature indicated in the characterising part of claim 1. Advantageous further developments of the method according to the invention and preferred devices for carrying it out are apparent from the sub-claims.

By virtue of the fact that the traction member during the reverse stroke is kept under a degree of tension corresponding to its elastic stretch during the forward stroke, the traction member is kept permanently in an elastically stretched state, so that the alternation of stretching and relaxation is eliminated in each step. As the drawing device is supported on the wall of the ditch facing the stretching path and forming an abutment, and this wall can be destabilised during a continuing alternation of stress and relaxation by loosening the earth, the method according to the invention also has the advantage that the abutment is better stabilized by the permanent stress.

A device for carrying out this method with an elastically stretchable traction member, which is passed through the pipe and is engagement acting in the direction of drawing therewith at its rear end in the direction of drawing, or which is in engagement acting in the direction of drawing with its front end in the direction of drawing, and with a drawing device disposed in the ditch, which is in engagement acting in the direction of drawing with the forward end of the traction member in the direction of drawing, the drawing device being an intermittently operating device with a forward and a reverse stroke, is preferably so designed that the drawing device is provided with a traction element which is engagement with a traction member during the forward stroke, and a retaining member, which is in engagement with the traction member during the reverse stroke.

Figure 1A:
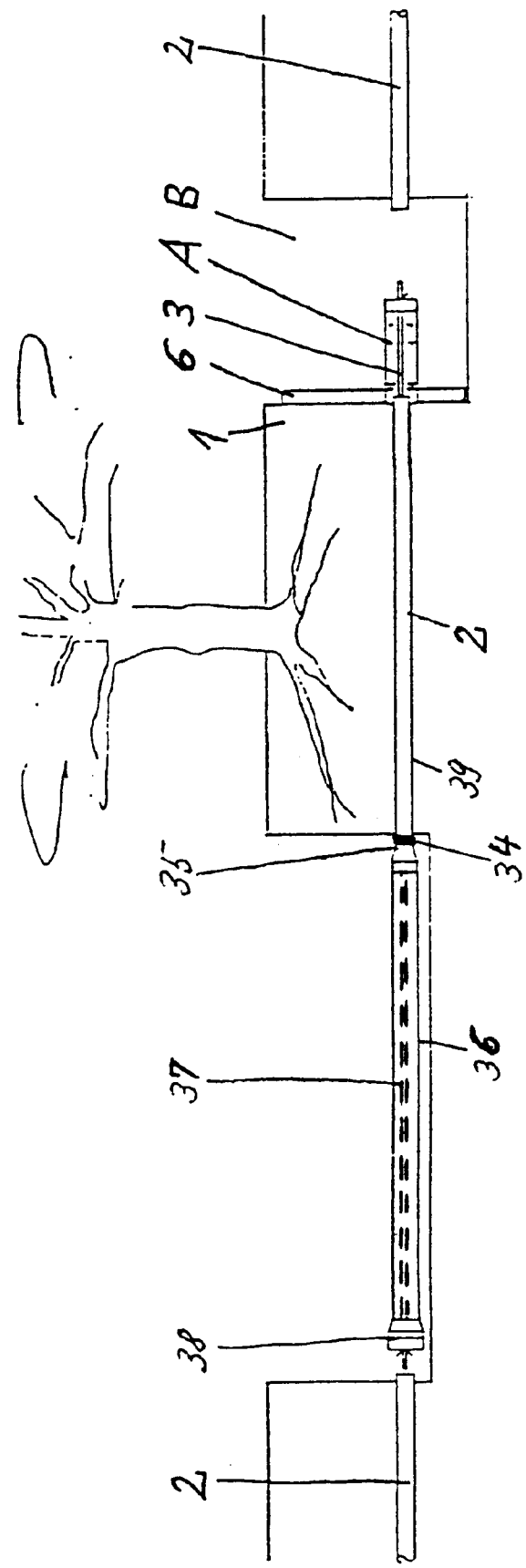
Figure 1B:
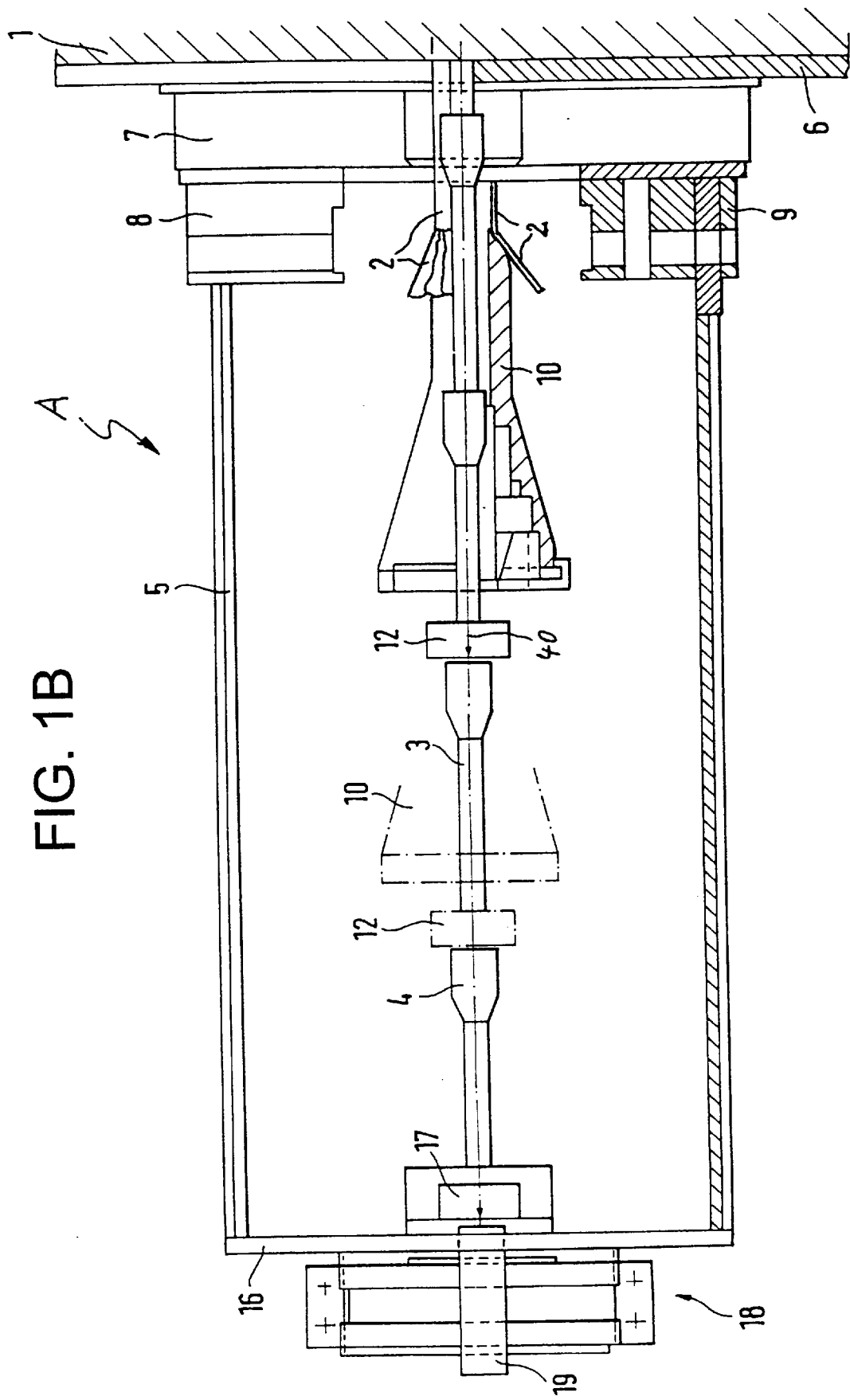
Figure 3:
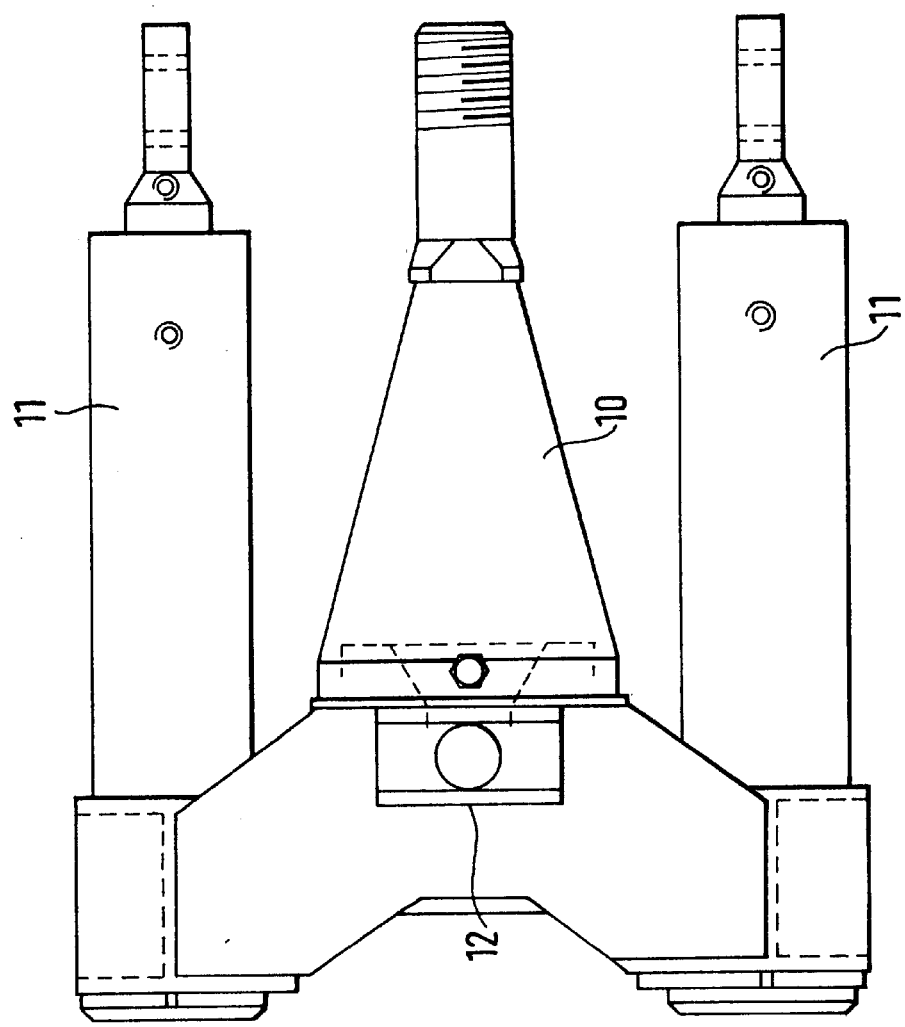
Figure 2:
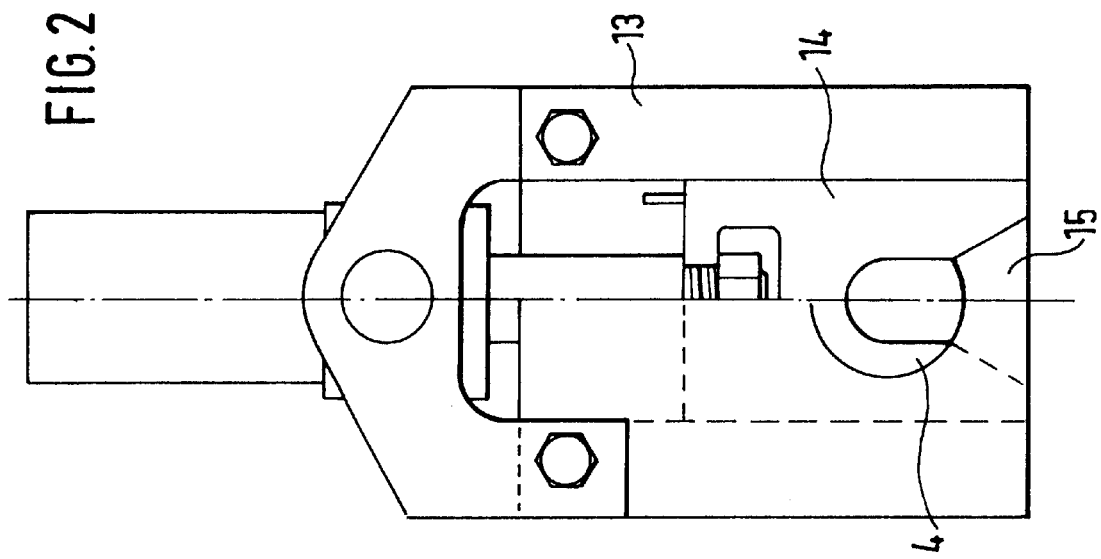
Figure 4:
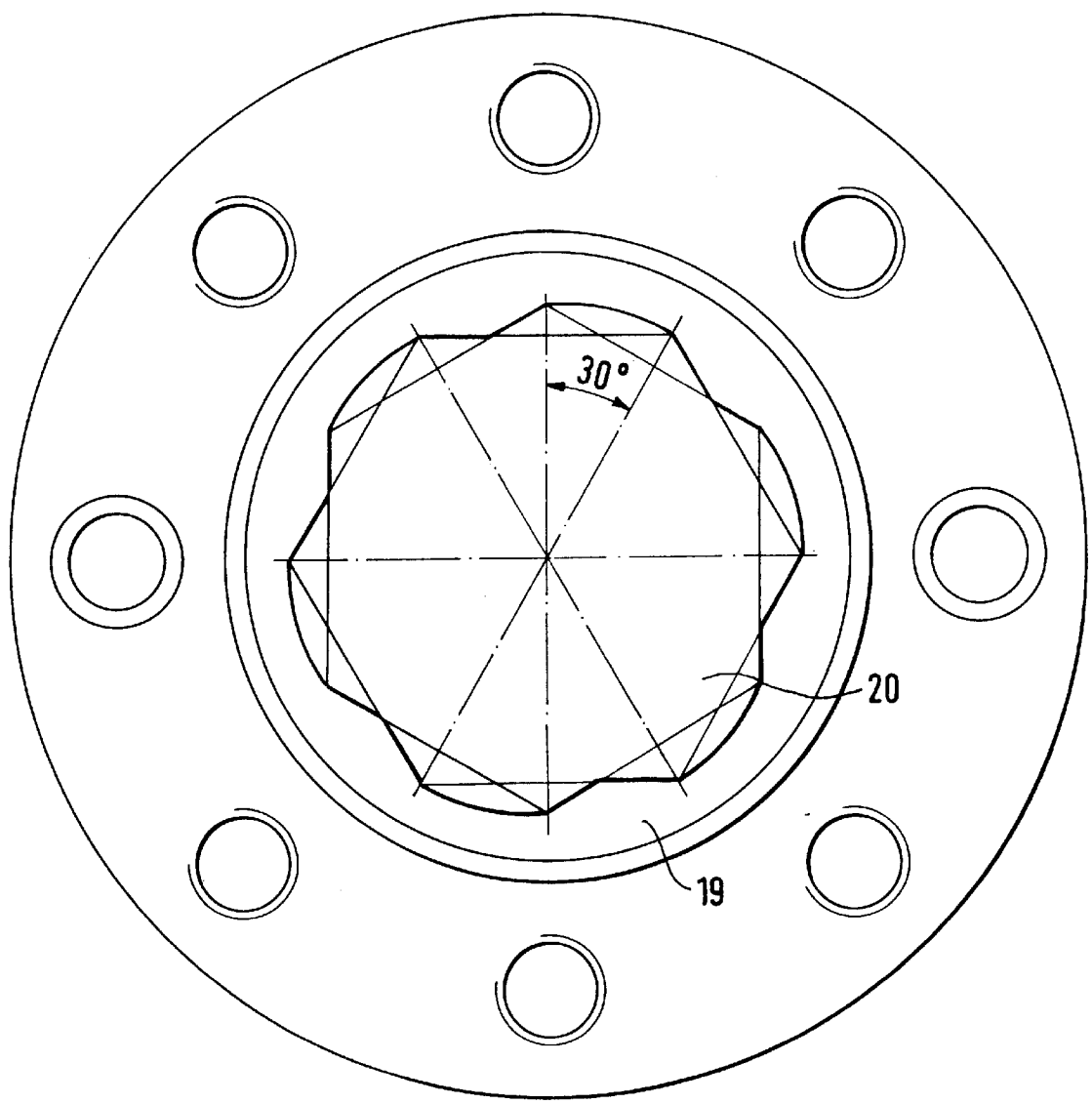
Figure 5:
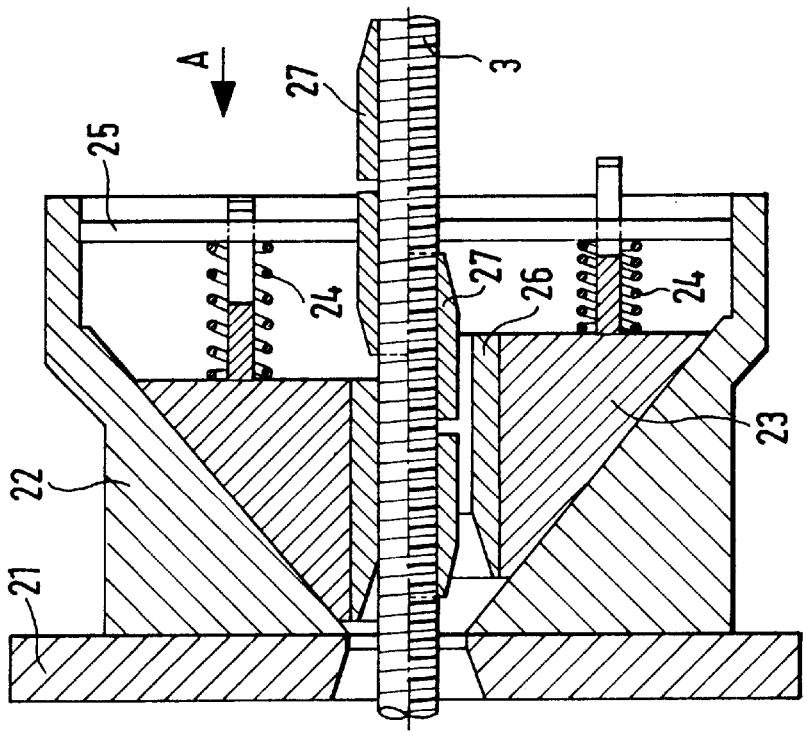
Figure 6:
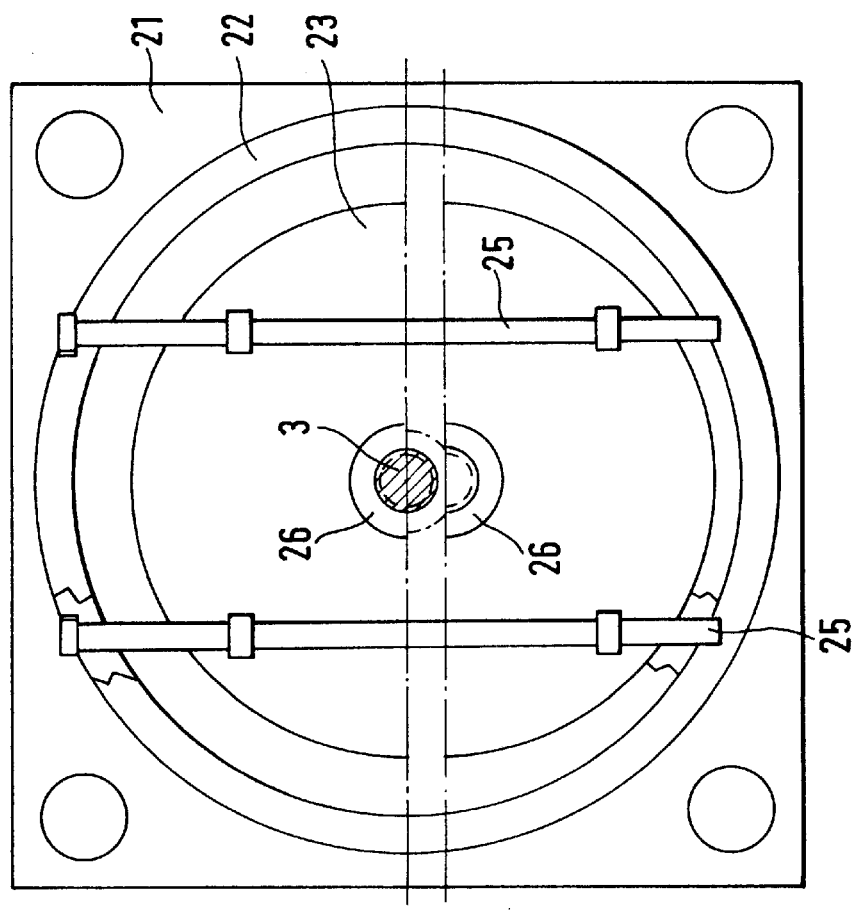
Figure 7:
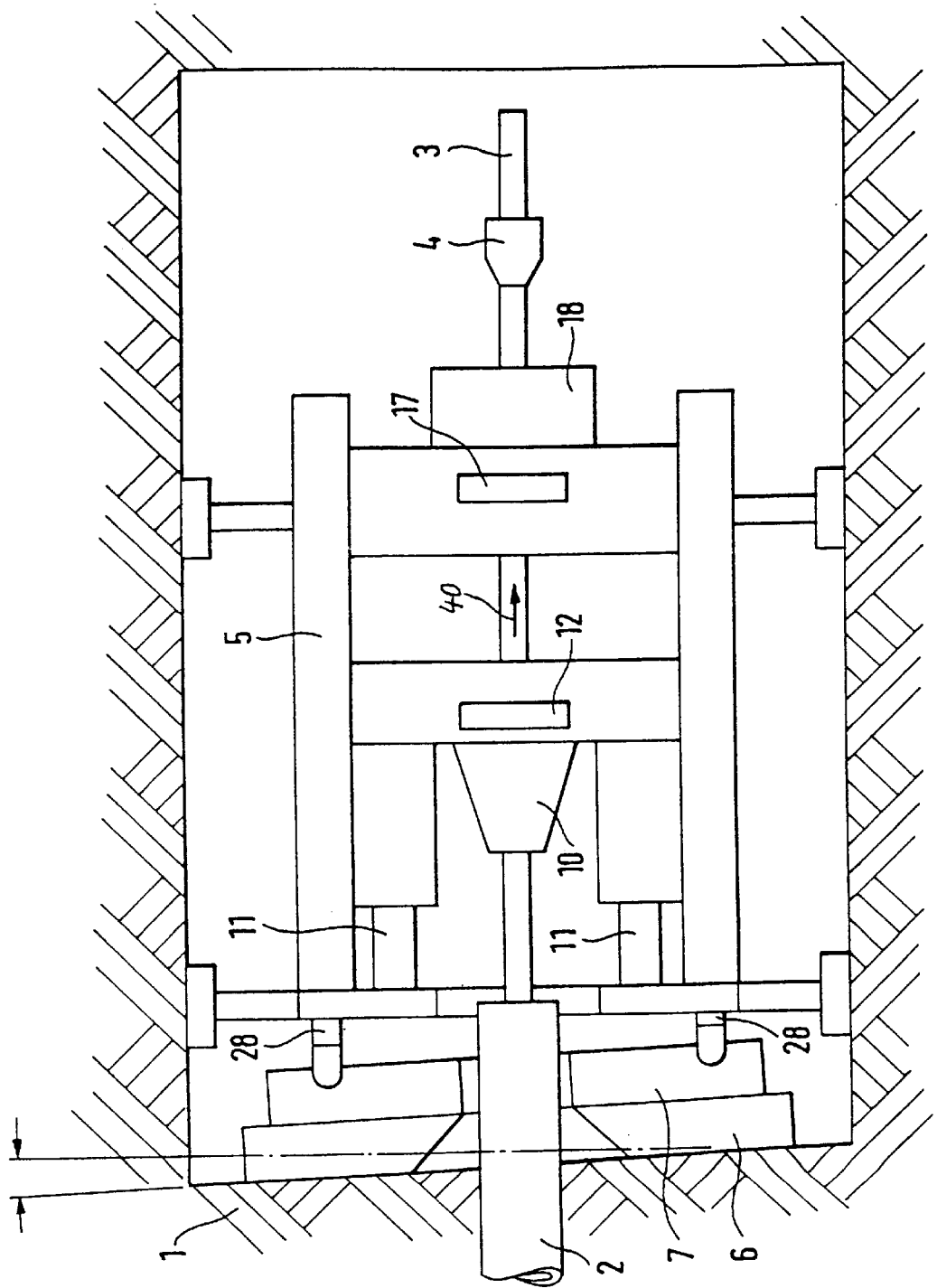
Figure 8:
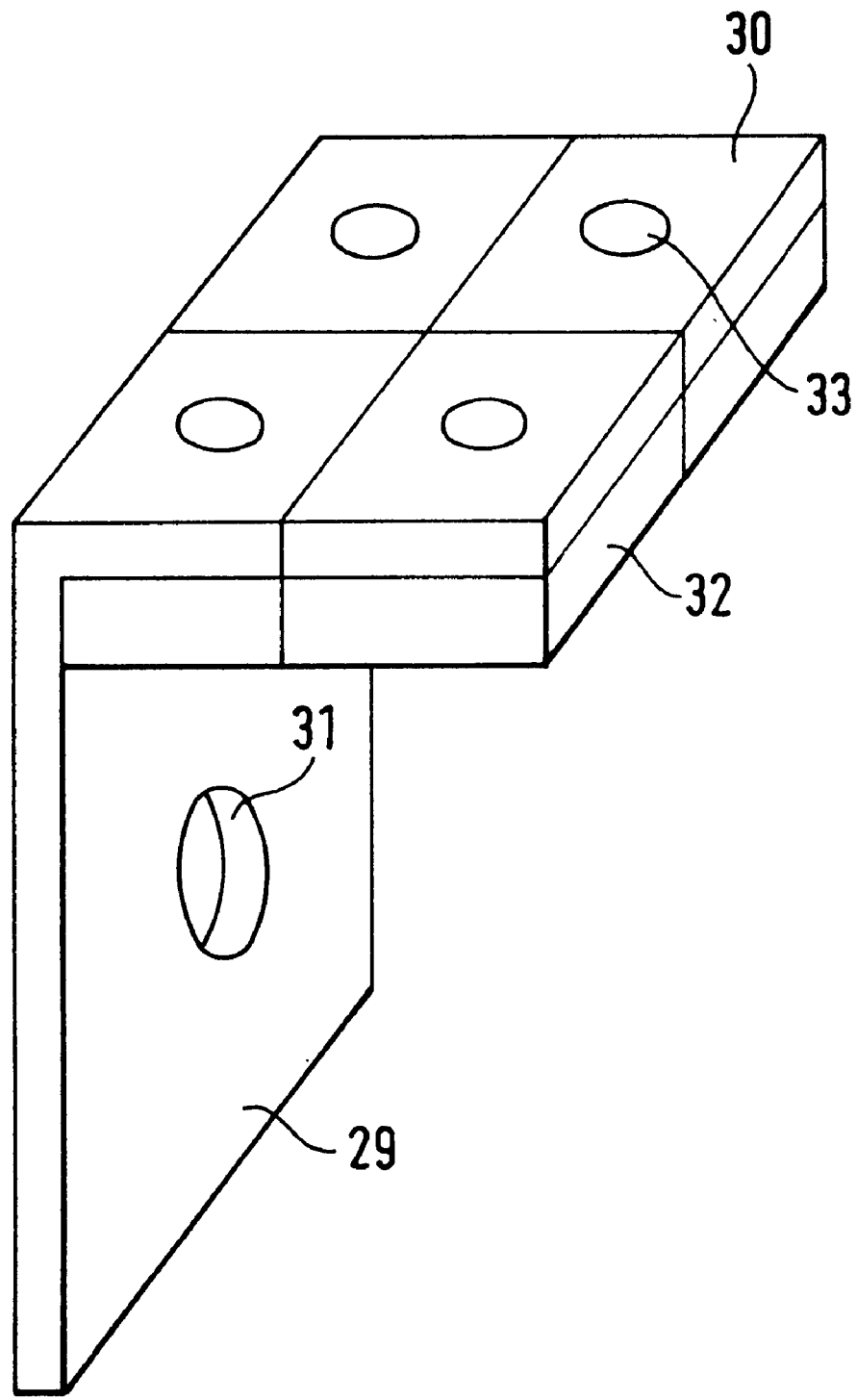

The invention will be explained in more detail in the following with reference to embodiments given by way of example and shown in the Figures, which show:

FIG. 1A: a schematic view of a device for pulling a pipe,

FIG. 1B: a side elevational view partly in section of a first embodiment of the drawing device, FIG. 2: an elevation of a drawing or retaining fork, FIG. 3: the drawing fork and the splitter cone with their guidance for the stroke movement, in plan view, FIG. 4: the unscrewing prism for uncoupling the individual rod members of a traction rod, FIG. 5: a clamping device for engagement between the drawing device and a traction rod in a cross-sectional view according to a second embodiment, FIG. 6: an elevation of the clamp device according to FIG. 5 in direction A, FIG. 7: a device for mounting the abutment plate in a way mobile relative to the drawing device, and FIG. 8: an angled or bent-over abutment plate.

The drawing device A shown in FIGS. 1A and 1B is located in a so-called target ditch B comprising the earth wall 1, forming the abutment during the drawing procedure. There opens into this earth wall 1B a passage through the earth, in which is contained a pipe 2 to be withdrawn, of which only the upper half is shown in FIG. 1. Passed through the pipe 2 is a traction rod 3, which engages for example by means of an anchor plate 34 behind the rear end of the pipe 2 in the direction of drawing, so that tensile forces aligned towards the target ditch are transmitted by the traction rod 3 to the pipe 2. The pipe 2 to be withdrawn can be coupled to an adapter 35 to a subsequent pipe 36 to be inserted. Thus the traction rod 3 can engage on the adapter 35, the old pipe 2 being pushed out of the adapter 35 and the new pipe 36, securely connected to the adapter 35, being inserted. A securing linkage 37 fixed in the adapter 35 is passed through the new pipe 36 and connected at the rear end of this new pipe 36 with a securing plate 38 overlapping the pipe end, so that sleeve joints present in the new pipe 36 are protected from being pulled apart.

The adapter 35 is coordinated to the dimensions of the pipe and is, in the case of an enlargement of diameter, in the form of an expanding cone. In this case in order to support the earth and to stabilize the pipe track, a thixotropic liquid 39 can therefore preferably be introduced under pressure between the pipes 2, 36 and the earth. The liquid serves both as a support means and as a lubricant for the drawing procedure.

The traction rod 3 is formed from a large number of short rod members, which are connected together by coupling sleeves (not shown) which are screwed onto the abutting ends of two respective adjacent rod members. The traction rod 3 also has at predetermined mutual distance retainer sleeves 4 with the aid of which the pipe 2 is drawn out of the earth by the length of the stroke during the forward stroke, and during reverse stroke the traction rod 3 is held at the tension caused by its elastic stretch.

The drawing device has a rigid frame 5, on the side of which facing the earth wall 1 there is an abutment or spectacle plate 6. Attached to a reinforcement plate 7 mounted thereon is a centering device for the pipe 2 with an upper vice grip 8 and a lower vice grip 9. The two vice grips 8 and 9 are vertically displaceable so that firstly the upper vice grip is passed down until it is located at a spacing corresponding to half the diameter of the pipe 2 above the centre line of the drawing device. Then the lower vice grip 9 is raised until the pipe 2 is securely clamped. This latter is now precisely centred, so that the splitter cone 10 described in the following can be passed precisely into it, without colliding with the forward cut edge of the pipe 2.

The splitter cone 10, the lower half of which is shown in cross-section in FIG. 1B, has a central axial bore through which the traction rod 3 is passed with the mounted coupling sleeves and retainer sleeves 4. The splitter cone 10 is displaceably mounted in the direction of drawing, which is indicated by arrow 40, on two guide rails 11 and is moved by one stroke length in the direction of drawing during a forward stroke with the traction rod 3 and the pipe 2, and during a reverse stroke is moved contrary to the direction of drawing by one stroke length relative to the stationary traction rod 3 and the pipe 2, passing into the open cut end of the centred pipe 2 and splitting it further open.

Rigidly connected to the splitter cone 10 is a drawing fork 12, so that this latter executes the same movements in or contrary to the direction of drawing as the splitter cone 10. The drawing fork 12 is shown in front view in FIG. 2. It has two fixed legs 13, between which a plate is mounted which is preferably movable hydraulically upwards and downwards. On its under side the plate 14 is provided with an incision 15, the size of which is so selected that it can receive the traction rod 3, but not the retaining sleeves 4. In its upper position therefore the plate 14 is located above the traction rod 3 in such a way that a free movement in or contrary to the direction of drawing can take place between them, which is not impaired by the retainer sleeves 4, while the plate 14, in its lower position, engages over the traction rod 3 and passes between the retainer sleeves 4, so that a movement between these in or contrary to the direction of drawing is restricted by the engagement between the plate 14 and the retainer sleeves 4.

Upon a plate 16, which terminates the frame 5 at the front end in the direction of drawing, there is secured a retainer fork 17, which has the same construction as the draw fork 12 with the exception that the plate of the retainer fork 17 is likewise movable upwards and downwards, but the retainer fork 17 itself cannot be moved in or contrary to the direction of drawing. On the side of the plate 16 opposite the retainer fork 17, there is secured an unscrewing device 18, which carries an unscrewing prism 19 disposed concentrically to the traction rod 3 and which may be driven rotarily. Said prism is shown in a front elevation in FIG. 4. The unscrewing prism 19 has a central passage 20 through which the traction rod 3 itself and also the retainer sleeves 4 secured thereon can pass. The coupling sleeves connecting the individual rod members of the traction rod 3 have a hexagonal outer surface, and the wall of the passage 20 is in the form of the inner wall of a hexagonal ring spanner, so that the coupling sleeves can in fact be pushed, when correctly positioned, into the unscrewing prism 19, but can only be rotated through an angle of a maximum of 30° relative thereto. During a drawing procedure the foremost coupling sleeve of the traction rod 3 is presented to the unscrewing prism 19 and, if the sides of coupling sleeve and unscrewing prism 19 are not covered, the unscrewing prism 19 is slightly rotated until the coupling sleeve can enter it. This procedure is simplified in that a clearance of 30° exists between them. Once the coupling sleeve has entered fully into the unscrewing prism 19, the drawing procedure is interrupted or is so coordinated that the forward stroke has just ended, and then, by rotating the unscrewing prism 19, the coupling sleeve is unscrewed from both ends of the rod members to that the foremost rod member is separated from the traction rod 3. It is possible to combine the retaining sleeves 4 and the coupling sleeves i.e. to use at least a part of the retaining sleeves 4 also for connecting the individual rod members, in which case these retaining sleeves must have a hexagonal outer surface.

This automatic unscrewing procedure is recommended for security reasons, as no personnel should be present in the target ditch during the entire drawing procedure. As the traction rod 3 is kept under tension even during the reverse stroke of the drawing device, the risk of accident during manual unscrewing of the rod members is too great.

The drawing procedure proceeds in the following way: after the traction rod 3 has been pushed through the pipe 2 and brought into engagement with the pipe end, the drawing fork 12 with the splitter cone 10 are brought into their rear position in the direction of drawing (the expanded position in FIG. 1), the plate 14 of the drawing fork 12 being in the raised position. The plate 14 is then lowered and the drawing fork 12 with the splitter cone 10 executes a forward stroke, so that these pass into the position shown in dotted lines in FIG. 1. Thus the plate 14 abuts against the retaining sleeve 4 lying in front of it, so that via these the traction rod 3 and the pipe 2 are extracted from the earth to a corresponding distance. The spacings between the retaining sleeves 4 are such that the plate of the retainer fork 17, which was previously in the upper position and has now been lowered, engages directly behind the previous retaining sleeve 4. The plate 14 of the drawing fork 12 can now be raised, without relaxing the elastically stretched traction rod 3, now held by the retaining fork 17. The drawing fork 12 and the splitter cone 10 are then returned to their rear position, the splitter cone 10 penetrating into the centred pipe 2 and splitting it. The plate 14 of the drawing fork 12 is again moved downwards, passing with the forward stroke directly behind a retaining sleeve 4, so that the forward stroke can be fully exploited. Once the plate 14 of the drawing fork 12 has moved downwards and holds the traction rod 3, the plate of the retaining fork 17 can be raised and then the next forward stroke may be executed. In this way the traction rod 3 is elastically stretched once, only at the beginning of the drawing procedure, and the elastic stretching is maintained during the entire drawing procedure. The individual unscrewing procedures by the unscrewing prism 19 and central clamping of the pipe 2 by the vice grips 8 and 9 are coordinated in time with the individual drawing steps.

Movement of the drawing forks 12 and of the splitter cone 10 in and contrary to the direction of drawing is preferably carried out by means of a hydraulic drive system, in which a movable hydraulic pump with a load-dependent output flow is used. This permits higher drive speeds at lower loads, i.e. in particular during the almost load-free return stroke and also during the forward stroke, after the pipe 2 is in motion, as the friction is then considerably less than during starting of the stationary pipe 2.

It is however also possible to eliminate the automatic unscrewing device and to carry out the unscrewing manually. As for this purpose however personnel must be present in the target ditch, for safety reasons the traction rod should not be kept under tension during unscrewing. As a rod member however is only unscrewed respectively after a plurality, for example three or four forward strokes, the traction rod also need only be relaxed after a plurality of forward strokes, while being kept under tension after the other forward strokes. The advantages of the method according to the invention are thus substantially retained.

The traction member need not exclusively be in the form of a traction rod, but may for example also be used in the form of a chain, cable, or high-tensile hose. This would have the advantage that unscrewing is not necessary. If small-diameter pipes, for example of less than 150 mm are extracted, then it is difficult to introduce the splitter cone into the pipe, as the traction member to a large extent fills the pipe cross-section. In this case it is recommended to use a size-reducing device acting from the exterior with two pressure clamps movable radial towards one another, and between which the pipe is clamped.

If the pipe to be extracted consists of steel, then its size cannot be reduced in the prescribed way, but it must be cut. For this purpose a thermal cutting device with plasma burners is advantageous. These are preferably secured on an axially stationary rim bearing surrounding the pipe. During the forward stroke the pipe is cut in the longitudinal direction and after one or a plurality of forward strokes the rim bearing is rotated, the pipe being cut in a circumferential direction. Before cutting, a ceramic-coated sleeve is inserted into the portion of the pipe to be cut off, surrounding the traction member and representing a thermal and mechanical protection for the latter. If the pipe has an external coating, for example of bitumen or tar, this must be removed before cutting at the cutting points. Suitable for this are grinding discs, which are held in a predetermined spatial association to the plasma burners.

Particularly in the case of pipes containing asbestos, it is recommended to provide the size-reducing device with a flushing device, so that the dust arising during the reduction in size can be bound by the flushing liquid and is not blown through the air.

FIGS. 5 and 6 show another embodiment for the connection between traction rod 3 and a drawing device for transmitting the tensile forces. The connection is in this case established by means of a clamp device. A clamp device is provided respectively as a traction member and as a retaining member, the clamp device acting as a traction member executing axially a forward and reverse stroke, while the clamp device acting as a retaining member is axially stationary. In this type of connection, in contrast to the first embodiment, the resilient engagement members on the traction rod are eliminated, as are the hydraulic drive for raising and lowering the drawing fork and retaining fork.

The clamp devices, identically designed for the traction member and the retaining member, have an attachment plate 21, which in the case of the retaining member is axially securely anchored on the frame 5, and which in the case of the traction member is secured to a cross-bar, which executes the forward and reverse stroke on the guide rails 11. Secured to the attachment plate 21 is a block 22 with a conical opening tapering towards the attachment plate 21. Inserted in the opening is a clamp cone 23, adapted in its inclination to said opening, and comprising at least three separate segments. Springs 24, supported at their other end on retaining rods 25, press the clamp cone 23 into the opening and into contact with the block 22.

The clamp cone 23 contains a central bore and is provided therein with gripper jaws 26, which are securely connected in the clamp cone 23. The traction rod 3 is passed between the gripper jaws 26. The traction rod 3 has on the outer side a rolled-on thread, which can engage with the internal thread of a coupling sleeve 27, so that thereby individual rod members may be connected together. The gripper jaws 26 are provided on the inner side with a complementary profile, so that when the gripper jaws 26 engage with the traction rod 3, large tensile forces can be transmitted therebetween, without a relative movement occurring between them.

When the clamp device serving as a traction member in FIG. 5 is moved contrary to arrow A during a forward stroke, the clamp cone 23 is firstly securely held by the traction rod 3, so that it is pressed further into the opening of block 22 and thus more strongly against the traction rod 3. When the engagement between these is so secure that the tensile force necessary for extracting or inserting the pipe 2 can be transmitted, the traction rod 3 is carried along by the clamp device. This condition is respectively shown in the upper halves of FIGS. 5 and 6. The respective lower halves of these Figures show the condition during the reverse stroke. Here the traction rod is stationary, while the clamp device is moved in the direction of arrow A. Due to the relative movement between these, the clamp cone is moved against the force of springs 24 slightly out of the opening in block 22, so that the gripper jaws 26 slide loosely on the traction rod 3. As the coupling sleeves 27 on both sides, and the gripper jaws 26 on one side are bevelled in a tapered fashion, these, when they abut on one another, slide firstly on their oblique surfaces, the clamp cone 23 being pressed further out of the opening in the block 22, until its surfaces parallel to the traction rod 3 slip on one another. In this way the clamp device can execute the reverse stroke, while the traction rod 3 is held by the other clamp device serving as a retaining member.

The clamp device serving as a retaining member is disposed in the same direction as the clamp device serving as a traction member. During the forward stroke the traction rod 3 moves contrary to arrow A. In this case the clamp wedge 23 is moved by the relative movement between the traction rod 3 and the stationary clamp device out of the opening in the block 22, so that the gripper jaws 26 slip on the traction rod 3. During the reverse stroke the traction member moves in the direction of arrow A. The traction rod 3 released by the traction member tries because of its expansion to follow this movement. In this case it however presses the clamp wedge 23 of the clamp device serving as a retaining member into the opening of the block 22, so that an engagement is produced between the gripper jaws 26 and the traction rod 3, which after a movement of the traction rod 3 of about 2 to 3 cm is so secure that the traction rod 3 can be held under the tension caused by its stretching, while the clamp device serving as a traction member executes the reverse stroke.

FIG. 7 shows a plan view of a target ditch with a drawing device installed therein. This latter is designed in the same way as the drawing device according to FIG. 1, but with the special feature that the abutment plate 6 supported on the earth wall 1 is not rigidly connected to the frame 5, but via hydraulically initially tensioned cylinders 28. Four in all of these cylinders 28 are provided, whose extrudable pistons are connected to the reinforcing plate 7.

As it often occurs that the earth wall 1 yields irregularly due to the tensile forces exerted thereon, deformations of the longitudinal spars of the frame 5 can occur as the earth wall 1 no longer extends vertically to the pipe axis. As further the pipe axis and the drawing axis coincide, transverse forces also act on the traction rod 3, which can lead to their overloading by additional bending stress. In order to mitigate the disadvantages caused by rigid attachment of the abutment plate to the frame of the drawing device, the flexible mounting of the abutment plate 6, brought about by the hydraulic cylinders 28, is provided. The abutment plate 6 can thus adapt to any inclination of the earth wall 1, without bending forces acting on the frame 5, which is laterally supported in the target ditch and if necessary at the opposite end. This adaptation is however not unlimited, as in the case of excessive inclination due to transverse forces between the abutment plate 6 and the earth wall 1, sliding of the device can occur. Angles of inclination of up to about 7°, may however simply be compensated for. If this value is exceeded, then end position switches respond, which switch the device off.

FIG. 8 shows a special bent-over or angled abutment plate with a leg 29 to be applied against the earth wall 1 and a leg 30, vertical thereto, which extends parallel to the surface of the earth. The leg 29 is provided with a passage aperture 31 for the traction member 3 or the pipe 2 to be extracted. This abutment plate serves particularly for drawing pipes which do not lie very deep beneath the surface of the earth. In the case of a flat abutment plate there is the risk here that the earth will break away behind the upper part of the abutment plate (so-called ground breakage). In order to prevent this, the horizontal leg 30 is provided. As the pipes respectively to be drawn lie however at different depths, a plurality of hydraulically operated stamps 32 (4 in FIG. 8) are provided beneath the leg 30, and which can be extended vertically to the leg 30 and thus bridge the respective space between the leg 30 and the surface of the earth. Inserted in the leg 30 are corresponding hydraulic presses 33. The pressure exerted by the stamps 32 on the earth prevents break-out of the earth. In the case of high tensile forces or very yielding earth, the leg 30 may also be provided with additional weights.

I claim:

1. A method for drawing a pipe laid in the earth or to be laid in the earth to a ditch lying beneath the surface of the earth and accessible therefrom, comprising:
   a) providing a drawing device having a traction member, said drawing device having the capability of forward and reverse strokes;
   b) passing said traction member through a pipe;
   c) attaching said traction member to the pipe for drawing the pipe in a desired direction of drawing;
   d) exerting said forward stroke on said traction member, whereby moving said pipe in the direction of drawing, toward a ditch; and
   e) prohibiting movement of said pipe during said reverse stroke under a tension corresponding to elastic stretch of said traction member during said forward stroke.

2. Method according to claim 1, wherein an end of the traction member located in the drawing device is held in the direction of drawing after termination of the forward stroke.

3. Method according to claim 1, wherein the pipe is drawn into the ditch, and after its entry into the ditch is reduced in size.

4. Method according to claim 3, wherein the pipe after its entry into the ditch and before being reduced in size, is centered.

5. Method according to claim 2, wherein the pipe is split.

6. Method according to claim 2, wherein the pipe is crushed.

7. Method according to claim 2, wherein the pipe is cut.

8. Method according to claim 7, wherein the pipe is cut in the longitudinal direction during the forward stroke, and after one or a plurality of forward strokes, is cut in the circumferential direction.

9. Method according to claim 1, wherein the drawing device executes the forward and reverse strokes at a speed depending on a load.

10. Method according to claim 1, wherein the traction member is a traction rod combined from individual sections, the sections being connected together by screwed sleeves, and in that the sections are respectively separated from the traction rod after leaving the drawing device, by automatic unscrewing of the screw sleeves from the traction rod.

11. Method according to claim 1, wherein a lubricant is introduced into a cavity between a pipe to be laid and the earth.

12. Method according to claim 11, wherein the lubricant is kept under pressure in order to support the earth or to stabilize the pipe track.

13. Device for drawing a pipe laid in the earth or to be laid in the earth to a ditch lying beneath the surface of the earth and accessible therefrom, comprising an elastically stretchable traction member, which is passed through the pipe and is in engagement with the pipe, the traction member is acting on the pipe in drawing the pipe in a desired direction of drawing, and with a drawing device disposed in the ditch, which is in engagement acting in the direction of drawing with a forward end of the traction member in the direction of drawing, the drawing device being an intermittently operating device with a forward stroke and a reverse stroke, wherein the drawing device is provided with a traction element which is in engagement with the traction member during the forward stroke, and a retaining member, which is in engagement with the traction member during the reverse stroke.

14. Device according to claim 13, wherein the traction member is connected to a drive device bringing about the forward and reverse strokes.

15. Device according to claim 13, wherein the retaining member is securely arranged in the direction of drawing.

16. Device according to claim 14, wherein the drive device causing the forward and rear strokes is a hydraulic pump, whose output flow is adjustable in dependence on load.

17. Device according to claim 13, wherein the traction is provided at predetermined intervals with a plurality of resilient engagement members, for engagement with the traction member and the retaining member.

18. Device according to claim 17, wherein the traction member and the retaining member are fork shaped and movable in a vertical direction, engaging in the engaged position with the resilient engagement members between these via the traction member.

19. Device according to claim 13, wherein the traction member and the retaining member represent wedge clamp devices, which, in dependence on the direction of the longitudinal forces acting on the traction member, are in or out of engagement therewith.

20. Device according to claim 19, wherein the wedge clamp devices are initially tensioned in the direction of engagement with the traction member.

21. Device according to claim 19, wherein the surface of the traction member and the surface of the wedge devices to be brought into engagement therewith are profiled in order to reinforce the engagement.

22. Device according to claim 13, wherein the drawing device has on the pipe a pipe entry side a centering device with vertically movable clamps one above and beneath the pipe.

23. Device according to claim 22, wherein the clamps have defined setting positions.

24. Device according to claim 13, wherein the traction member is a traction rod consisting of individual rod sections connected together by screw sleeves, and wherein, at the forward end of the drawing device in the direction of drawing there is provided an unscrewing device with an unscrewing prism drivable in the direction of rotation, by means of which a screw sleeve introduced into the unscrewing prism may be unscrewed from the adjacent rod sections.

25. Device according to claim 13, wherein the traction member is rigidly coupled in the direction of drawing with a splitter cone.

26. Device according to claim 13, wherein two radially movable pressure clamps are provided for crushing the pipe drawn into the ditch.

27. Device according to claim 13, wherein a cutter device is provided, having a plurality of plasma burners, for thermally cutting the pipe drawn into the ditch.

28. Device according to claim 27, wherein the plasma burners are disposed on a rim bearing stationary in the direction of drawing.

29. Device according to claim 27, wherein the cutting device has a protective member for the traction member.

30. Device according to claim 29, wherein the protective member is a ceramic-coated sleeve covering the traction member and introducible into the pipe to be cut.

31. Device according to claim 25, wherein a flushing device is provided for binding the dust occurring during reduction of size of the pipe drawn into the ditch.

32. Device according to claim 13, wherein the traction member is a chain, a cable or a high-tension hose.

33. Device according to claim 13, wherein there is disposed between a pipe laid in the earth and to be extracted and a pipe to be simultaneously laid and drawn into the earth, an adapter, which is in engagement acting in the direction of drawing with the traction member and with the pipe to be extracted and with the pipe to be drawn in.

34. Device according to claim 13, wherein an abutment plate supported on the earth wall into which the pipe to be extracted opens, is provided in the ditch, and on which in turn the drawing device is supported, and in that between the abutment plate and the drawing device there are provided hydraulic cylinders for compensating an oblique positioning of the abutment plate relative to the vertical pipe axis.

35. Device according to claim 34, wherein four hydraulic cylinders are provided for a horizontal and/or vertical compensation.

36. Device according to claim 34, wherein a plurality of end-position switches are provided for detecting when the maximum acceptable oblique position is exceeded.

37. Device according to claim 13, wherein there is provided in the ditch an abutment plate supported on the earth wall into which the pipe to be extracted opens, said abutment plate being bent over in such a way that it has a leg extending parallel to the surface of the earth, and bearing against the earth wall.

38. Device according to claim 37, wherein, in order to compensate for a space between the leg and the surface of the earth, a plurality of hydraulic stamps are attached on the underside of the leg.

39. Device according to claim 37, wherein the leg is loaded by weights.

* * * * *